INVENTOR
THEODOOR HENDRIK MARKUS
BY Young & Thompson
ATTORNEYS

United States Patent Office 3,649,407
Patented Mar. 14, 1972

3,649,407
PRODUCING ARTICLES OF SYNTHETIC
MATERIAL BY MOLDING AND BONDING
Theodoor Hendrik Markus, Bilthoven, Netherlands, assignor to Grontmij, Grondverbetering-En Ontginningmaatschappij N.V., De Bilt, Netherlands
Filed Dec. 20, 1968, Ser. No. 785,713
Claims priority, application Netherlands, Dec. 29, 1967, 6717828
Int. Cl. B29c 19/00
U.S. Cl. 156—245      5 Claims

ABSTRACT OF THE DISCLOSURE

Profiled members such as beams and girders having smooth surfaces all over, are produced by assembling a plurality of sections that have one smooth side and one rough side, and adhesively bonding the rough sides to each other to leave the smooth sides outermost. Fillers and reinforcements may be included between the sections. The sections are sufficiently flexible or remoldable that they can take on a somewhat different shape upon assembly.

---

The invention relates to a process for the production of an article of synthetic material, more specifically of reinforced polyester resin, which articles has a smooth surface and is composed of several parts, said parts being produced by molding. Although the invention is not restricted to the production of profiles of synthetic polyester resin, such as channel sections, T-shaped profiles, L-shaped profiles, and the like, which may be used as girders for the floors of outdoor swimming pools or bridges, it does relate more specifically to those elements.

Various processes for the production of such elements are known. Generally, the parts of which the articles have been composed are constructed by spraying the polyester resin mixed with glass fibers onto the mold having the desired form. After the material has hardened, the part thus obtained is taken from the mold and connected with the other parts by bonding with polyester resin. This makes it possible for air pockets to occur, especially where larger elements are concerned. The element obtained in this way has a smooth surface on the side that has rested against the smooth surface of the mold during its production, whereas the surface on the opposite side is far less smooth. Accordingly, elements that had to have a smooth surface all over, were necessarily constructed as hollow elements.

It is an object of the invention to provide a process which enables massive elements to be constructed, all the surfaces of which are smooth and without any air pockets, and also to enable the production of hollow elements the outer and inner surfaces of which are smooth. The invention aims particularly at providing a process for the production of profile girders such as girders for adjustable floors of swimming pools that have to be smooth according to the sanitary regulations, and bridge girders which are exposed to the elements. An additional object of the invention is to attain high dimensional accuracy of the elements to be constructed.

It is also a common practice to use a press in constructing such elements. Inside this press the liquid synthetic resin material is molded into the right shape with simultaneous heating. It is true that by this process elements can be obtained having smooth surfaces all over, but such a press is very costly and can either not be adjusted at all, or only with difficulty, while the glass comes to the surface, as no gelcoat can be applied in such a process. This is caused by using heated molds which have different shapes for different elements.

It is still another object of the invention to provide a process which is cheap, flexible, and eminently suitable for the construction of articles have great dimensions, such as beams, columns and girders having a great length.

This last object is achieved according to the invention by the fact that such a thin layer of synthetic material is applied to the molds, forming the negative of the outer surfaces of the elements to be constructed, that thin remoldable shells are obtained of the element to be constructed, said outer shells subsequently being provided with a first coating on the rough surface away from the mold and then pressed together with the side of the not-yet-hardened first coating.

According to the invention the element to be constructed is thus formed from a number of preformed shells of a polyester resin material, for instance, which shells are made in such a way that they are still sufficiently flexible to undergo changes of shape, provided these are not too great. The preformed shells can be made in great numbers and stored. Because the shells are deformable, they can be used for the production of articles differing in shape from each other.

According to the invention the shells can be made in a relatively cheap way by spraying a layer of a polyester resin material with glass fibers onto a mold of the desired design. After the polyester has hardened, the shell can be removed from the mold. By taking care that the surface has a smoothly finished surface, a shell is obtained having a smooth outer side and a rough inner side. For the construction of the desired element from the preformed shells, the latter are provided with a first coating on the rough side and are subsequently pressed together, the sides provided with the first coating facing each other, in a pressing machine suitable for the purpose, which is provided with dies, the pressing molds of which correspond with the contour of the desired element and act on the smooth outer surfaces of the shells. Yet polyester resin material may be economically used as an adhesive medium for the shells, said adhesive medium hardening in pressing to a great extent, and producing a proper adhesion.

By the aforementioned process articles are formed by the shells pressed together, having a smooth outer surface all over, and no costly dies are required. The molds can be manufactured of a relatively cheap material, polyester resin reinforced with glass fiber, for instance, while no special demands have to be made upon the surface condition.

According to the invention it is possible for filling material to be placed between the shell divisions to be pressed together, before they are constructed according to the invention, said filling material filling up the spaces between the shell divisions after the pressing.

By varying the amount of filling material such as adhesive material to be applied between the shell sections, the element can be constructed in varying thicknesses.

Also, articles can be constructed with the aid of preformed shell sections of one special design, each article slightly varying in form from the other, by giving to the dies in the molding machine a slightly deviating form and by placing so much filling material between the shell sections that in compressing those shell sections, said shell sections are squeezed against the inner wall of the dies by the filling material between the shell sections.

According to the invention reinforcements can be applied against the inner sides of the articles to be constructed, as reinforcement in the desired direction. Although the process according to the invention is highly efficient in the production of shapes such as girders for the floors of swimming pools and bridges, it may also be adopted in the production of other elements, preferably having an open profile. It is conceivable, however, to construct hollow elements, provided a pressure can be built up inside them.

The invention will now be explained more fully by reference to the figures, showing by way of example an embodiment of the process for the construction of T-shaped girders, which can be used as girders for the adjustable floors of swimming pools and bridges.

Figure 1:
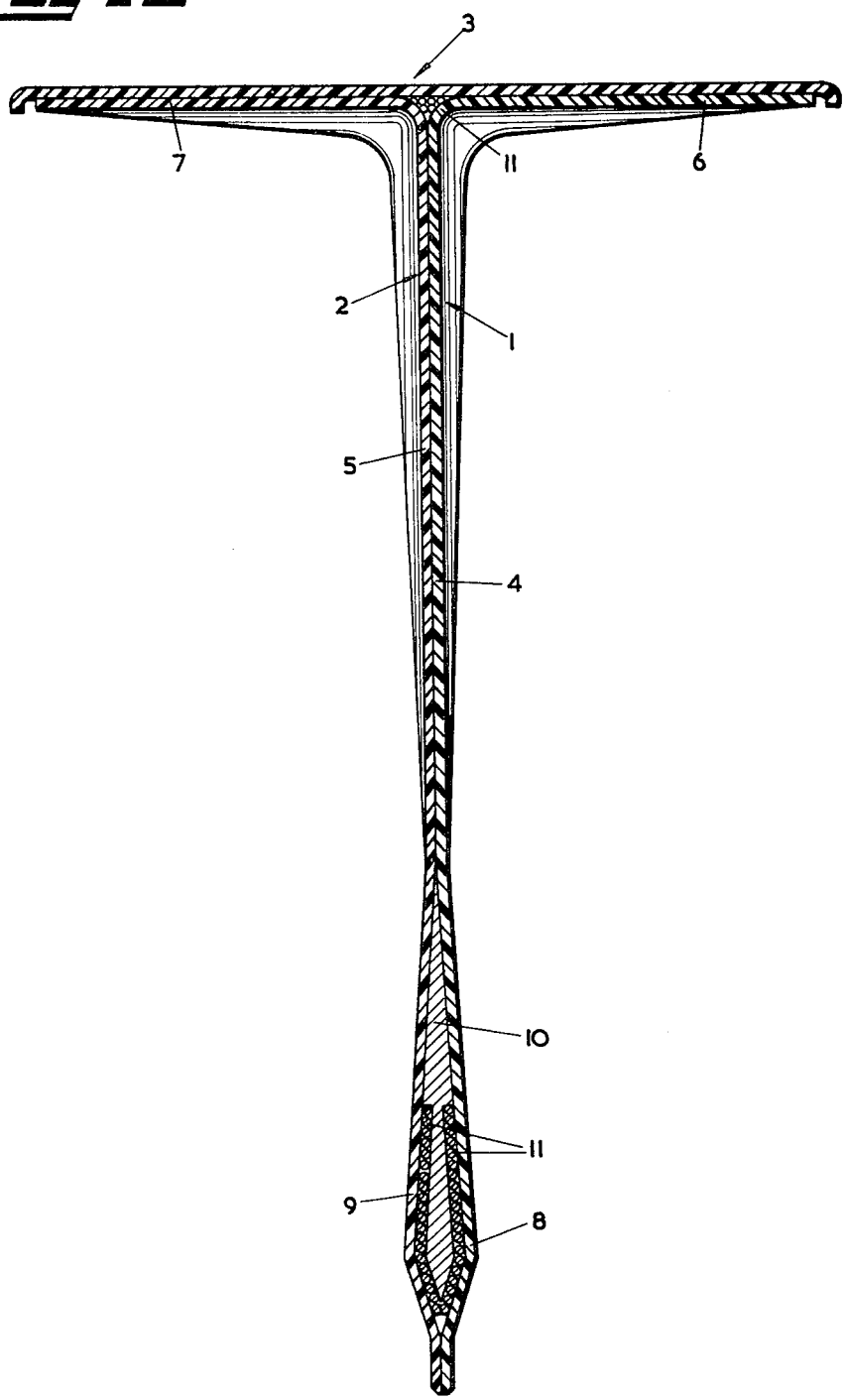
FIG. 1 shows a cross-section of a T-shaped girder constructed by the process of the invention.

In FIG. 1 a cross-section through a T-shaped girder is shown, which girder may be used in the construction of the adjustable floors of swimming pools. The girder has been composed of three shell sections of polyester resin, shown at 1, 2 and 3, each having a smooth outer surface. Each of the shell sections 1 and 2 comprises a vertical portion 4 and 5 respectively, and a horizontal portion 6 and 7 respectively. Each of the vertical portions 4 and 5 has an outwardly extending portion 8 and 9 respectively. The shell sections 1, 2 and 3 have been constructed in advance by a process known per se, which consists in spraying a layer of polyester resin onto molds provided for the purpose. The hardened shell sections have been compressed in the T-shaped profile, shown in the drawing in FIG. 1, in a way more fully described below with reference to FIGS. 2 and 3.

The space between the outwardly extending portions 8 and 9 of the shell sections 1 and 2 is filled with a filling 10, while the space between the shell section 3 and the rounded corners of the shell sections 1 and 2 is also filled with such a filling. Furthermore reinforcement 11 is provided both on the inner sides of the outwardly extending portions 8 and 9, and also in the space at the intersection of the shell sections 1, 2 and 3.

Figure 2:
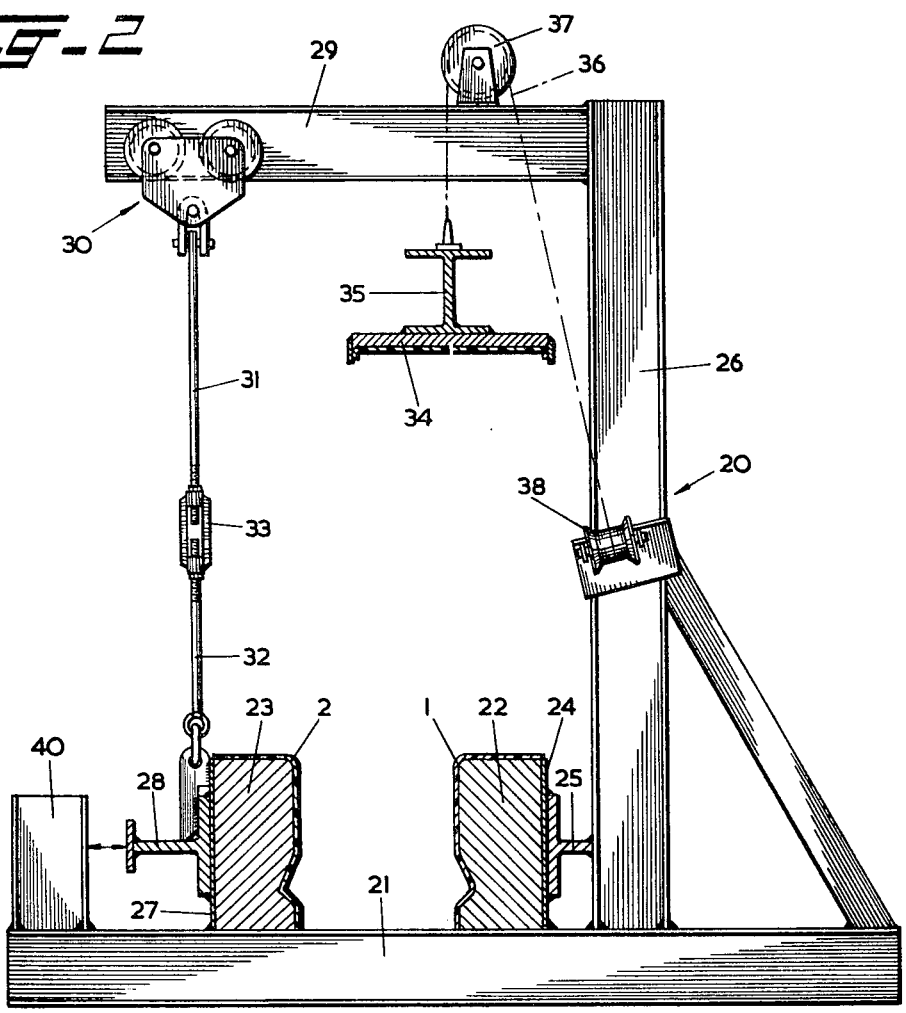
FIG. 2 shows an apparatus for the construction of the girder of FIG. 1.

The apparatus shown in FIG. 2 is used for the production of the T-beam shown in FIG. 1. The apparatus comprises of a framework 20 composed of a number of channel beams. The apparatus also comprises two molds 22 and 23 resting on the base 21 of the framework, the adjacent walls of the molds having a profile that either corresponds with, or practically corresponds with, the shape of the vertical portions of the shell sections 1 and 2, while the height, width and length of the molds 22 and 23 match the corresponding dimensions of the shell sections 1 and 2. The fixed mold 22 rests with its rear wall against a plate 24, which is welded to a T-beam 25, which is in turn welded to the column 26 of the framework. The movable mold 23 rests with its rear wall against a plate 27 that is welded to a horizontal movable I-beam 28. The horizontal I-beam 28 is suspended from a travelling trolley via a suspension rod, composed of two elements 31 and 32, said travelling trolley running along the upper I-beam 29 of the framework in a horizontal direction. The two parts 31 and 32 of the suspension rod are interconnected by a turnbuckle 33.

In addition, the apparatus comprises a vertically movable mold 34 the form of the underside of which corresponds to the form of the shell section 3 of the T-beam. The mold 34 is detachably fastened by its upper portion to an I-beam 35 which is suspended from one end of a cable 36 which is reeved about a hand winch 38 at its other end, via a pulley 37 disposed on the upper beam 29, said hand winch being mounted on the column 26.

In order to construct the T-shaped profile from the shell sections 1, 2 and 3, the shell sections 1 and 2 are positioned with their smooth outer surfaces on the molds 22 and 23 respectively, while the sides away from the molds are covered with a wet layer of polyester resin 39. Subsequently the mold with the shell section 2 on it is moved toward the fixed mold 22 and pressed against it with the aid of a screw jack disposed between the fixed upright 40 and the I-beam 28 as shown schematically in FIG. 3 by the arrows pointing in opposite directions.

During the pressing operation a filling material 10 is applied between the two outwardly extending portions 8 and 9 of the shell sections 1 and 2, and an additional reinforcement 11 is provided against the inner walls of those portions. Once the shell sections 1 and 2 have been pressed together, the shell section 3, to the underside of which an additional wet layer of polyester resin 41 has been applied, is placed across the upper surfaces of the horizontal portions of the shell sections 1 and 2, pressed together, and some filling material 42 is applied between the shell section 3 and those horizontal portions.

The vertically movable mold 34 is then positioned across the shell section 3 by means of a hand winch 38, the shell section 3 then being pressed against the shell sections 1 and 2. While the shell sections 1, 2 and 3 are being pressed together, the spaces between the shell sections, where these do not come into contact with each other, are full of filling material, while the shell sections are bonded together by the wet layers of polyester resin. When the pressing operation has been finished, the molds 23 and 34 are removed, after which the T-shaped profile can be taken from the molding machine. The outer surface of the T-shaped profiles thus obtained is smooth all over.

An additional advantage of the production of beams and the like according to the invention consists in that they need hardly undergo any changes of shape due to shrinkage, because any shrinkage occurring in the component parts of the shell will act in opposite directions. The molds 22, 23 and 34 are interchangeable and replaceable. They can be replaced by molds varying in form.

Figure 3:
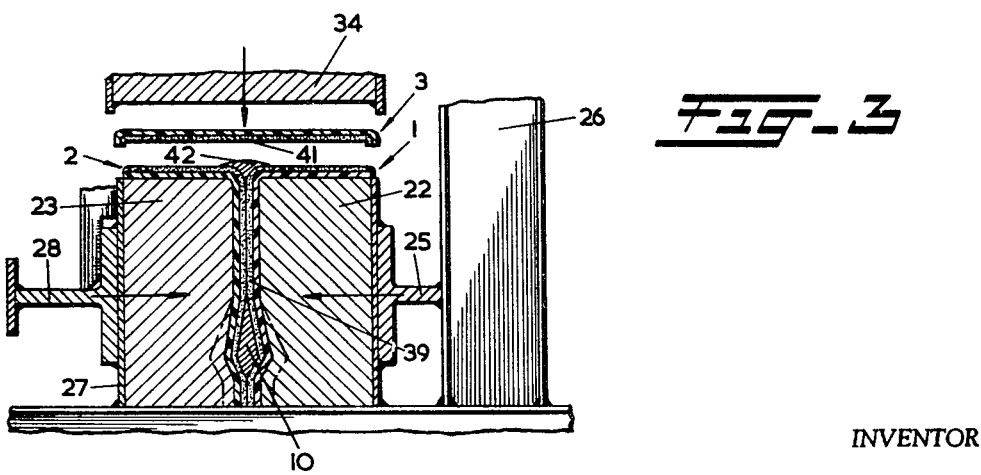
FIG. 3 shows a detail of a stage in the construction of the girder of FIG. 1.

A dotted line in FIG. 3 indicates a modified form of the molds 22 and 23. With such modified forms, T-shaped profiles can be constructed having a greater thickness in their vertical parts, whereby greater strength is obtained. This greater thickness is obtained by providing more filling material between the outwardly extending portions of the shell sections 1 and 2. Because the shell sections have been constructed so thin that they can be remolded, the shell sections 1 and 2 in this case will follow the deviation in form of the molds 22 and 23 and be capable of assuming the form indicated by the dotted lines in FIG. 3.

Products differing in shape and strength can be constructed with the aid of the same shell sections 1, 2 and 3, there being no need for any costly modifications to be made to the apparatus for the production thereof.

Apart from the T-beam shown in the drawings, other sectional shapes may also be constructed in the same way. An L-shaped profile, for instance, will be composed of two L-shaped shells, and a channel section will be composed of two U-shaped shells, placed inside each other. Hollow profiles can also be constructed, a tubular profile, for instance; here a closed inner shell is constructed on a reducing mold on the outside of which two or more outer shells are placed. In this case it is imperative, however, for the inner shells to be provided with an interior support during the compression, by means of air pressure, for instance. Apart from steel sections, elements vaying in form can also be constructed, a ship's hull, for instance, provided the shells forming the outer sides can be divided, which shells form the desired element with their rough sides placed together.

Having described my invention, I claim:

1. A method for producing a large article of synthetic resin having all outer surfaces smoothly finished and having a continuously solid cross section between said smoothly finished surfaces, comprising applying a thin layer of hardenable synthetic resin to the mold surfaces of a plurality of molds which together form the negative of the outer surfaces of the article to be constructed which layer coats the mold surfaces, allowing said layers to harden, which layers after hardening are still flexible and have a surface turned away from the smooth surface of the mold that is rougher than the said smooth surface, applying a further layer of synthetic resin to said rougher surfaces after the hardening of said thin layers and pressing the thus freshly coated surfaces against each other and allowing the freshly applied resin to set thereby to secure together said smooth-surfaced layers so as to complete the article to be formed.

2. A method as claimed in claim 1, and retaining said thin layers on said mold surfaces during the pressing together of the freshly coated surfaces, and urging said mold surfaces toward each other to press said freshly coated surfaces against each other.

3. A method as claimed in claim 1, and inserting a filling material between said freshly coated surfaces prior to pressing said surfaces against each other.

4. A method as claimed in claim 1, and inserting a reinforcement between said freshly coated surfaces before said freshly coated surfaces are pressed against each other.

5. A method as claimed in claim 1, in which said synthetic resin is applied to said mold surfaces by spraying.

References Cited

UNITED STATES PATENTS

| | | | |
|---|---|---|---|
| 2,113,434 | 4/1938 | Schuhmann | 156—153 |
| 3,035,310 | 5/1962 | Sokol et al. | 156—245 X |
| 3,037,771 | 6/1962 | Gambino | 156—245 X |
| 3,185,605 | 5/1965 | Osborne et al. | 156—245 X |
| 3,193,424 | 7/1965 | Scott | 156—153 X |
| 3,498,870 | 3/1970 | Fritchey | 156—153 X |

CARL D. QUARFORTH, Primary Examiner

S. J. LECHERT, Jr., Assistant Examiner

U.S. Cl. X.R.

156—145, 228